United States Patent [19]

Kidd

[11] 4,055,036
[45] Oct. 25, 1977

[54] MULTIPLE SPINDLE ROTARY MOWER
[75] Inventor: Earl H. Kidd, Galesburg, Ill.
[73] Assignee: Outboard Marine Corporation, Waukegan, Ill.
[21] Appl. No.: 718,097
[22] Filed: Aug. 26, 1976

Related U.S. Application Data

[63] Continuation of Ser. No. 555,964, March 6, 1975, abandoned.

[51] Int. Cl.² .................................... A01D 35/264
[52] U.S. Cl. .............................. 56/13.6; 56/320.2
[58] Field of Search .................... 56/13.3–13.6, 56/13.8, 6, 17.5, 202, 295, 255, 320.1, 320.2, 503

[56] References Cited

U.S. PATENT DOCUMENTS

| 2,719,396 | 10/1955 | Morris et al. ............... 56/320.2 X |
| 2,898,723 | 8/1959 | Goodall ............................ 56/13.6 |
| 3,118,267 | 1/1964 | Shaw ............................. 56/320.2 X |
| 3,245,209 | 4/1966 | Marek ........................... 56/13.6 X |
| 3,469,376 | 9/1969 | Bacon ................................ 56/6 |
| 3,483,684 | 12/1969 | Price ............................... 56/13.6 |
| 3,485,018 | 12/1969 | Beckering et al. ............. 56/13.6 |
| 3,667,199 | 6/1972 | Bloom ........................... 56/320.2 |
| 3,916,606 | 11/1975 | Brudnak, Jr. et al. ...... 56/320.2 X |

Primary Examiner—Jay N. Eskovitz
Attorney, Agent, or Firm—Michael, Best & Friedrich

[57] ABSTRACT

Disclosed herein is a rotary lawn mower comprising a blade housing supported for travel in adjacent relation to the ground, a first rotary cutter blade supported for rotation within the blade housing, a second rotary cutter blade supported for rotation within the housing about an axis located in laterally rearwardly offset relation from the rotary axis of the first cutter blade and for clipping discharge from the rotary path of the second cutter blade into the rotary path of the first cutter blade, and a grass clipping discharge arranged for delivery thereto of clippings solely from the rotary path of the first cutter blade.

24 Claims, 5 Drawing Figures

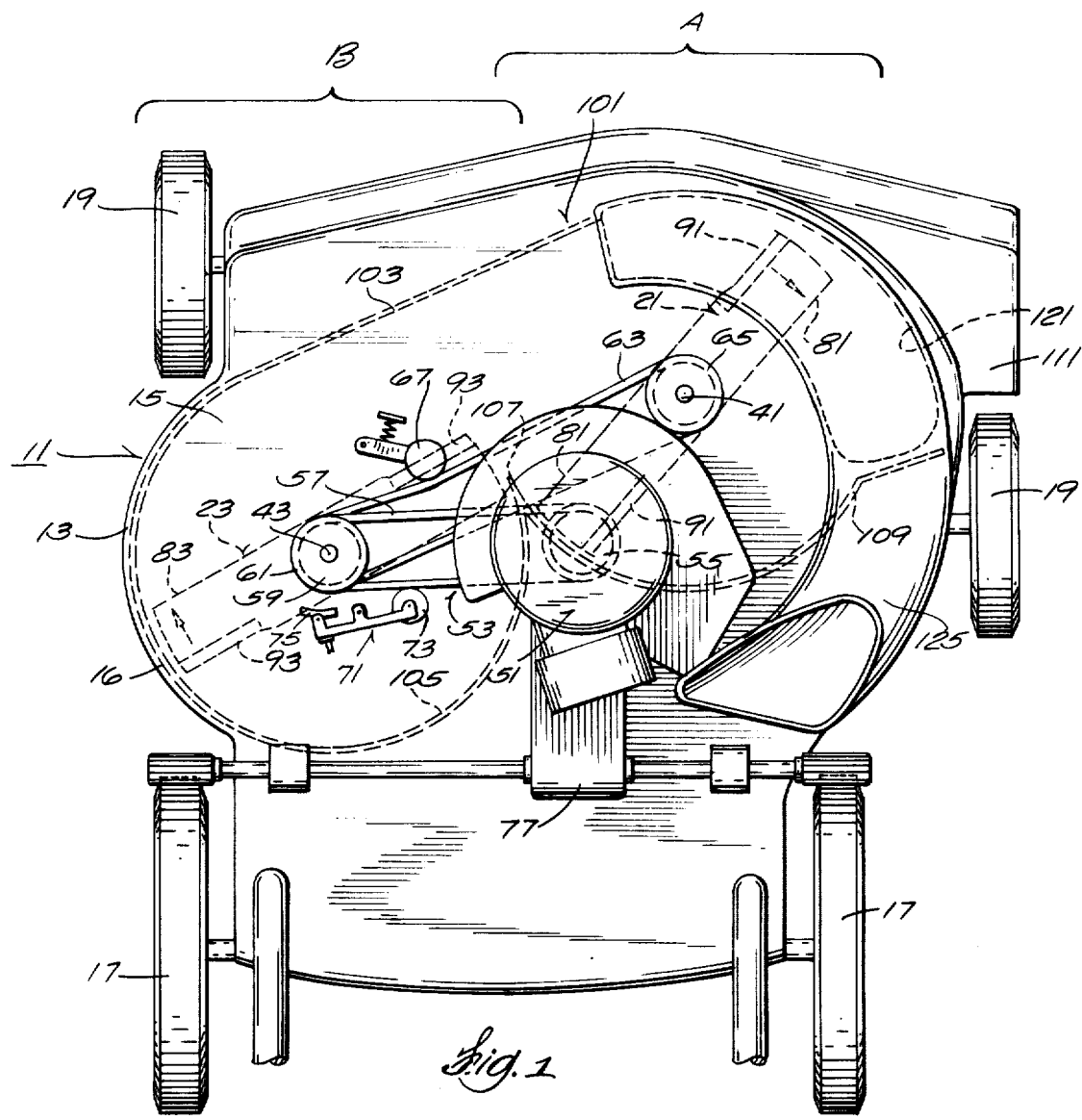
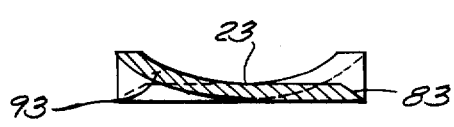
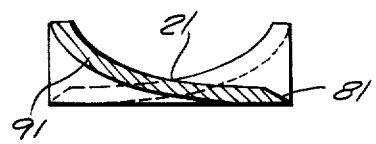

MULTIPLE SPINDLE ROTARY MOWER

This is a continuation of application Ser. No. 555,964 filed Mar. 6, 1975.

BACKGROUND OF THE INVENTION

The invention relates to rotary lawn mowers and particularly to multi-blade rotary lawn mowers.

More specifically, the invention relates to grass clipping discharge and catching arrangements for such multiblade rotary mowers.

Prior multi-blade or spindle rotary mowers have experienced only limited or poor success with respect to grass catching.

SUMMARY OF THE INVENTION

The invention provides a rotary lawn mower comprising a blade housing supported for travel in adjacent relation to the ground, a first rotary cutter blade supported for rotation within the blade housing, a second rotary cutter blade supported for rotation within the housing about an axis located in laterally rearwardly offset relation from the rotary axis of the first cutter blade, means for guiding grass clipping discharge from the rotary path of the second cutter blade into the rotary path of the first cutter blade, and a grass clipping discharge means arranged for delivery thereto of grass clippings solely from the rotary path of the first cutter blade.

In accordance with one embodiment of the invention, the blade housing includes a depending wall having a generally straight portion, the first rotary cutter blade is supported for rotation with the periphery of the rotary path of the first cutter blade extending in tangentially adjacent relation to the straight portion of the depending wall, and the second rotary cutter blade is supported for rotation with the periphery of the rotary path of the second cutter blade extending in tangentially adjacent relation to the straight portion of the depending wall whereby grass clippings are discharged from th rotary path of the second cutter blade into the rotary path of the first cutter blade.

In one embodiment of the invention, the housing includes a top deck and the grass clipping discharge means includes an opening in the top deck and a side discharge opening in the depending wall.

In an embodiment of the invention, means removably connectable to the housing are provided for closing one of the openings, which means can include a discharge chute communicable with the opening in the top deck, together with a baffle blocking the side discharge opening.

In an embodiment of the invention, the depending wall further includes a first arcuate portion merging with the straight portion and extending in the direction counter to the direction of rotation of the second cutter blade and adjacent to and for about 270° around the periphery of the rotary path of the second cutter blade, together with a second arcuate portion extending in adjacent relation to the periphery of the path of the first cutter blade and in the direction counter to the direction of rotation of the first cutter blade from the first arcuate wall portion.

In an embodiment of the invention, there is provided means associated with each of the cutter blades and operative in response to cutter blade rotation for conveying grass clippings for discharge from the respective paths of cutter blade rotation, which conveying means associated with the first cutter blade has a greater capacity than the conveying means associated with the second cutter blade.

One of the principal features of the invention is the provision of a multi-blade or spindle rotary mower wherein the clippings cut by one blade are directed to the other blade for discharge from the housing.

Another of the principal features of the invention is the provision of a multi-spindle rotary mower with good grass catching or collecting ability.

Another of the principal features of the invention is the provision of a multi-blade rotary mower wherein the cutter blades are arranged in tandem and wherein one of the blades is provided with a greater airlift or clipping discharge capacity than the other blade.

Other features and advantages of the embodiments of the invention will become known by reference to the following drawings, general description and claims.

THE DRAWINGS:

FIG. 1 is a top view of a rotary lawn mower incorporating various of the features of the invention.

FIG. 2 is an end view of one of the cutter blades incorporated in the mower shown in FIG. 1.

FIG. 3 is an end view of another of the cutter blades incorporated in the mower shown in FIG. 1.

Figure 4:
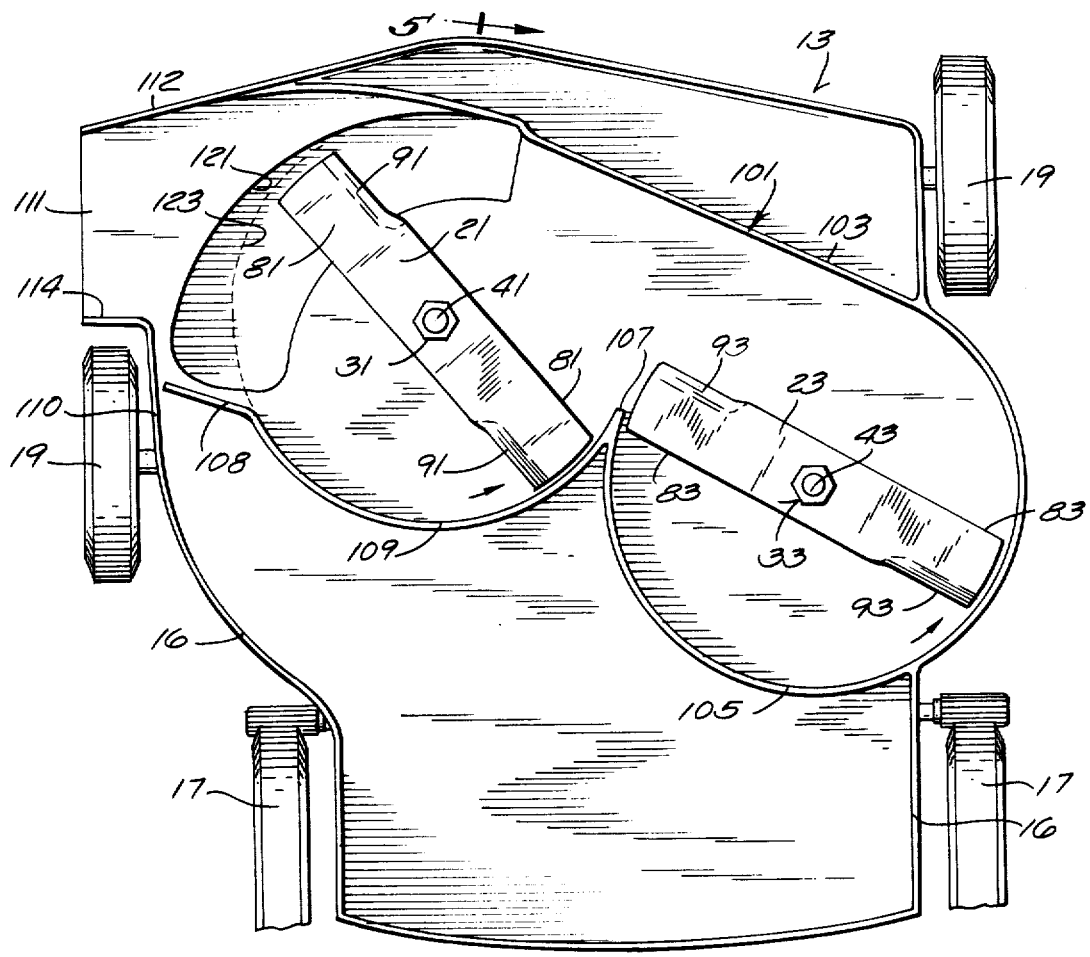
FIG. 4 is a bottom view of the mower shown in FIG. 1.
Figure 5:
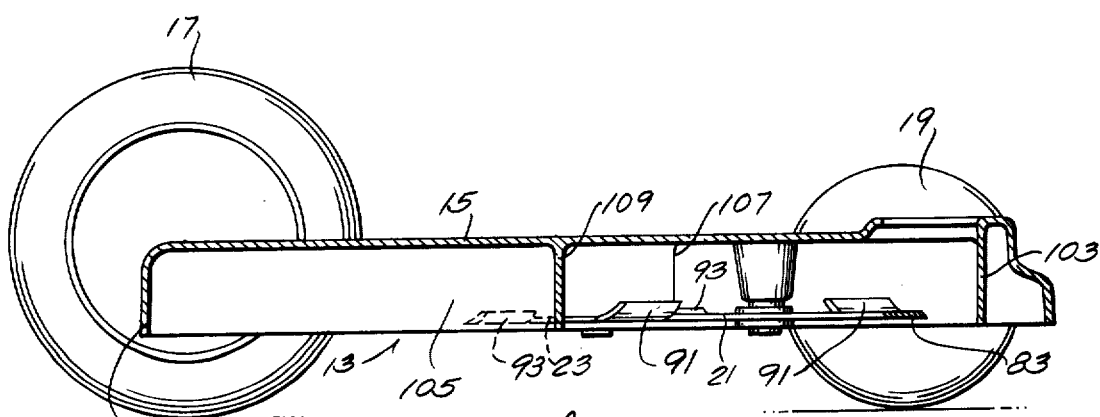
FIG. 5 is a sectional view, with parts omitted, taken along line of 5—5 of FIG. 4.

Before describing the embodiments of the invention in detail, it is to be understood that the invention is not limited in its application to the details of construction and the arrangements of the components set forth in the following description or illustrated in the drawing. The invention is capable of other embodiments and of being practiced and carried out in various ways. Also, it is to be understood that the phraseology and terminology employed herein is for the purposes of description and should not be regarded as limiting.

GENERAL DESCRIPTION

Shown in the drawings is a rotary lawn mower 11 which incorporates various of the features of the invention and which is preferably self-propelled. However, the invention also extends to push-type mowers and to riding mowers.

The mower 11 includes a blade housing 13 which includes a top deck 15 and a depending side wall 16 and which is suitably supported above the ground and for travel along the ground. While various supporting arrangements can be employed, in the illustrated construction, such means comprises a pair of rear wheels 17 and a pair of forward wheels 19.

Provided in the housing are first and second cutter blades 21 and 23 respectively, together with respective shaft and bearing means 31 and 33 on the housing for rotatably supporting the first and second cutter blades 21 and 23 within the blade housing 13 with the rotary axis 43 of the second cutter blade 23 being located, with respect to the intended direction of blade housing movement, in laterally and rearwardly offset relation to the rotary axis 41 of the first cutter blade 21. The effective cutting areas of the respective cutter blades 21 and 23 is indicated by the respective reference letters A and B in the drawings.

Means are provided for rotating the cutter blades 21 and 23. While other constructions could be employed, in the illustrated construction, such means comprises an engine 51 mounted on the blade housing 13 and a drive train 53 extending from the engine 51 to the cutter blades 21 and 23. While various drive trains can be employed, in the illustrated construction, the engine 51 includes an output shaft carrying a drive pulley 55 which is connected by a drive belt 57 to a pulley 59 connected fixedly to the second cutter blade 23. Also connected fixedly to the second cutter blade 23 is another pulley 61 which is connected through a drive belt 63 to a pulley 65 fixedly connected to the first cutter blade 21. A suitable belt tightener such as a biased idler pulley 67 can be employed between the first and second cutter blades 21 and 23. In the illustrated construction, the cutter blades 21 and 23 are both rotated at approximately the same speed and rotate in the clockwise direction as seen from above.

In addition, it is preferred to employ, in connection with the drive to the second cutter blade 23, a combination brake and clutch mechanism 71 which can include a selectively positionable idler pulley 73 operable selectively to remove slack from the drive belt 57 and a brake shoe 75 engagably with the drive belt 57 to brake movement thereof.

A suitable drive mechanism 77 is also preferably employed to drive the rear wheels 17 from the engine 51, which mechanism 77 can include means for selecting drive at one or more speeds.

The cutter blades 21 and 23 are, except as explained hereinafter, of generally conventional structure and comprise elongated bars having, at the outer leading ends thereof, respective cutting edges 81 and 83 and having, along the outer trailing ends thereof, lift means in the form of respective upstanding vanes 91 and 93 operative to propel a stream of air and thereby to convey grass clippings from the paths of the rotary cutting blades 21 and 23. Preferably, the vanes 91 on the first cutter blade 21 have a vane area greater than the area of the vanes 93 on the second cutter blade. Thus, in the illustrated construction, the vanes 91 on the first cutter blade 21 have a height of about 11/16 of an inch, whereas the vanes 93 on the second cutter blade 23 have a height of about ½ inch. Thus, for a given speed of rotation, the first cutter blade 21 has a greater grass clipping conveying capacity than the second cutter blade 23.

Means are provided for guiding grass clipping discharge from the path of the second cutter blade 23 into the path of the first cutter blade 21. While various arrangements can be employed, in the illustrated construction, a vertical wall 101 depends downwardly from the top deck 15 of the blade housing 13 and extends, in part, in closely adjacent relation to the periphery of the rotary paths of the first and second cutter blades 21 and 23. More specifically, the depending wall 101 includes a straight portion 103 extending in generally tangential relation to the rotary paths of the first and second blades 21 and 23, which straight portion 103 is operative to cause grass clippings to flow from the rotary path of the second cutter blade 23 into the rotary path of the first cutter blade 21 for subsequent discharge from the blade housing 13.

The depending wall 101 further includes an arcuate portion 105 which extends in closely adjacent relation to the path of the second cutter blade 23 from the area of tangential relationship between the rotary path of the second cutter blade 23 and the straight portion 103 of the wall 101, in the direction opposite to the direction of rotation of the second cutter blade 23, i.e., in the counter clockwise direction, for a distance of about 270° and which terminates at a point 107 located generally in the vicinity of a straight line connecting the axes 41 and 43 of the first and second cutter blades 21 and 23.

The depending wall 101 further includes another arcuate portion 109 which extends, from the point 107, in the counter clockwise direction around and in closely adjacent relation to the periphery of the path of the first cutter blade 21 to adjacent a side discharge grass clipping chute 111. If a side discharge chute 111 is not employed, the arcuate wall portion 109 can extend continuously to the area of tangential relationship between the straight wall proton 103 and the periphery of the rotary path of the first cutter blade 21.

As shown in FIG. 4, a short vertical wall 108 extends between the end of the arcuate wall portion 109 and a portion 110 of the blade housing side wall 16.

As already indicated, the mower blade housing 13 includes grass clipping discharge means arranged for delivery from the housing of grass clippings solely from the path of the first cutter blade 21. While various arrangements can be employed, it is preferred to employ an opportunity for selectively discharging the grass clippings through either a top deck discharge opening 121 or through a side discharge opening 123 (indicated by a dotted line in FIG. 4) located in the depending wall 101 and communicating with the laterally extending side discharge chute 111 already referred to.

While other arrangements are possible, in the illustrated construction, the side discharge chute 111 includes forwardly and rearwardly spaced vertical walls 112 and 114, respectively, and extends arcuately from the area of tangential relationship between the straight portion 103 of the depending wall 101 and the periphery of the rotary path of the first cutter blade 21. If desired, the depending wall 101 can also include a short arcuate portion between the straight portion 103 and the side discharge chute 111. As indicated, the side discharge opening 123 constitutes an interruption in the depending wall 101 between the straight portion 103 and the arcuate portion 109.

The top discharge opening 121 extends in the top deck 15 in generally adjacent relation to the side discharge opening 123 and partially above the rotary path of the first cutter blade 21. When the mower is used for side discharge of grass clippings, the top deck discharge opening 121 is closed by a removable cover (not shown). When it is desired to catch or collect the grass clippings, the cover is removed and replaced with a top deck discharge chute 125 which can extend rearwardly for application thereto of a grass clipping bag, as shown in the U.S. Shaw Pat. No. 3,118,267, issued Jan. 21, 1964, or for discharge of clippings to a recepticle carried rearwardly of the blade housing as disclosed in the U.S. Carpenter application Ser. No. 503,348, filed Sept. 5, 1974.

The side discharge opening 123 is closed when using the top discharge opening 121 and accordingly, the top discharge chute 125 preferably includes an arcuate baffle (not shown) which is operative to close the side discharge opening 123 and in effect, becomes part of the depending wall 101. If desired, a baffle element (not shown) separate from the top discharge chute 125 can be attached to the housing 13 to close the side discharge opening 123 when using the top discharge chute 125.

Because the grass clippings from the second cutter blade 23 are delivered to the rotary path of the first cutter blade 21 for discharge from the blade housing 13, it is preferred that the first cutter blade 21 be capable of conveying a greater quantity of grass clippings than the second cutter blade 23. Various means can be employed for increasing the grass clipping conveying capacity of the first cutter blade 21 as compared to the second cutter blade 23. For instance, the drive train 53 could be arranged by suitable means to rotate the first cutter blade 21 at a faster speed that the second cutter blade 23. In the illustrated construction, the first cutter blade 21 is provided with increased grass clipping delivery capacity as compared to the second cutter blade 23 by employing larger vanes 91 with greater vertical height and lift area on the first cutter blade 21 as compared to the vanes 93 on the second cutter blade 23.

In operation, grass clippings cut by the second cutter blade 23 are delivered through the space between the point 107 and the depending wall straight portion 103 into the rotating path of the first cutter blade 21 for discharge with the grass clippings cut by the first cutter blade 21 from the housing through either the side discharge chute 111 or through the top discharge chute 125 and into a collection bag. Thus, there is provided a multi-spindle rotary mower capable of effectively collecting grass clippings cut by both the first and second cutter blades.

Various of the features of the invention are set forth in the following claims.

What is claimed is:

1. A rotary lawn mower comprising a blade housing, means supporting said blade housing for travel in a forward direction in adjacent relation to the ground, a first rotary cutter blade supported for rotation within said blade housing about a forwardly located axis, and a second rotary cutter blade supported for rotation within said blade housing about an axis located in laterally rearwardly offset relation from said rotary axis of said forwardly located first cutter blade, said blade housing further including a grass clipping discharge outlet located, at least in part, forwardly of said rotary axis of said forwardly located first cutter blade, and diametrically opposite with respect to said rotary axis of said forwardly located first cutter blade from said rotary axis of said rearwardly located second cutter blade, and in adjacent relation to the rotary path of said forwardly located first cutter blade for discharging from said blade housing grass clippings delivered solely from said forwardly located first cutter blade, said blade housing further including a depending wall including a generally straight portion extending in adjacent relation to a tangent extending from the peripheries of the rotary paths of said cutter blades, a first arcuate portion merging with said straight portion and extending in the direction counter to the direction of rotation of said rearwardly located second cutter blade, whereby the grass clippings cut by said rearwardly located second cutter blade are delivered to the path of the forwardly located first cutter blade adjacent to said depending wall straight portion, and a second arcuate portion extending in adjacent relation to the rotary path of said forwardly located first cutter blade from said first arcuate portion in the direction counter to the direction of rotation of said forwardly located first cutter blade, whereby the grass clippings cut by said forwardly located first cutter blade and the grass clippings delivered to the path of the forwardly located first cutter blade from the rearwardly located second cutter blade are delivered from said blade housing through said discharge outlet.

2. A rotary lawn mower in accordance with claim 1 wherein said housing includes a top deck and wherein said grass clipping discharge outlet comprises a discharge opening in said top deck.

3. A rotary lawn mower in accordance with claim 1 wherein said grass clipping outlet comprises a side discharge opening in said depending wall.

4. A rotary lawn mower in accordance with claim 1 wherein said housing includes a top deck and wherein said grass clipping discharge outlet includes a side discharge opening in said depending wall and a discharge opening in said top deck.

5. A rotary lawn mower in accordance with claim 4 and further including means removably connectable to said housing for closing one of said openings.

6. A rotary lawn mower in accordance with claim 5 wherein said means removably connectable to said housing comprises a discharge chute communicable with said opening in said top deck and means blocking said side discharge opening.

7. A rotary lawn mower in accordance with claim 1 and further including means associated with each of said cutter blades and operative in response to cutter blade rotation for conveying grass clippings for discharge from the respective paths of cutter blade rotation, said conveying means associated with said first cutter blade having a greater capacity than said conveying means associated with said second cutter blade.

8. A rotary lawn mower in accordance with claim 7 wherein said grass clipping conveying means includes means for rotating said cutter blades and upwardly extending vane means adjacent the outer ends of said cutter blades.

9. A rotary lawn mower in accordance with claim 8 wherein said cutter blade rotating means is operable to rotate said cutter blades such that the speed of said first cutter blade is greater than the speed of said second cutter blade.

10. A rotary lawn mower in accordance with claim 8 wherein said vane means on said first and second cutter blades define lift areas such that said lift areas on said first cutter blade are greater than said lift areas on said second cutter blade.

11. A rotary lawn mower in accordance with claim 10 wherein said vane means on said first cutter blade have a greater vertical dimension than the vane means on said second cutter blade.

12. A rotary lawn mower in accordance with claim 1 wherein said first and second cutter blades have approximately the same length and are rotated at approximately the same speed.

13. A rotary lawn mower comprising a blade housing, means supporting said blade housing for travel in a forward direction in adjacent relation to the ground, a first rotary cutter blade supported for rotation within said blade housing about a forwardly located axis, and a second rotary cutter blade supported for rotation within said blade housing about an axis located in laterally rearwardly offset relation from said rotary axis of said forwardly located first cutter blade, said blade housing further including a grass clipping discharge outlet located, at least in part, forwardly of said rotary axis of said forwardly located first cutter blade, and diametrically opposite with respect to said rotary axis of said forwardly located first cutter blade from said rotary axis of said rearwardly located second cutter blade, and in adjacent relation to the rotary path of said forwardly located first cutter blade for discharging from said blade housing grass clippings delivered solely from said forwardly located first cutter blade, said blade housing further including a depending wall including a generally straight portion extending in adjacent relation to a tangent extending from the peripheries of the rotary paths of said cutter blades, said depending wall further including an arcuate portion in adjacent relation to a rearward part of the periphery of the rotary path of at least one of said cutter blades, means for rotating said second cutter blade in the direction which is effective to discharge grass clippings forwardly along said straight portion of said depending wall and into the path of rotation of said second cutter blade, whereby the grass clippings cut by said rearwardly located second cutter blade are delivered to the path of the forwardly located first cutter blade adjacent to said depending wall straight portion, and means for rotating said second cutter blade in the same rotary direction as said first cutter blade, whereby the grass clippings cut by said forwardly located first cutter blade and the grass clippings delivered to the path of the forwardly located first cutter blade from the rearwardly located second cutter blade are delivered from said blade housing through said discharge outlet.

14. A rotary lawn mower in accordance with claim 13 wherein said housing includes a top deck and wherein said grass clipping discharge outlet comprises a discharge opening in said top deck.

15. A rotary lawn mower in accordance with claim 13 wherein said grass clipping outlet comprises a side discharge opening in said depending wall.

16. A rotary lawn mower in accordance with claim 13 wherein said housing includes a top deck and wherein said grass clipping discharge outlet includes a side discharge opening in said depending wall and a discharge opening in said top deck.

17. A rotary lawn mower in accordance with claim 16 and further including means removably connectable to said housing for closing one of said openings.

18. A rotary lawn mower in accordance with claim 17 wherein said means removably connectable to said housing comprises a discharge chute communicable with said opening in said top deck and means blocking said side discharge opening.

19. A rotary lawn mower in accordance with claim 13 and further including means associated with each of said cutter blades and operative in response to cutter blade rotation for conveying grass clippings for discharge from the respective paths of cutter blade rotation, said conveying means associated with said first cutter blade having a greater capacity than said conveying means associated with said second cutter blade.

20. A rotary lawn mower in accordance with claim 19 wherein said grass clipping conveying means includes upwardly extending vane means adjacent the outer ends of said cutter blades.

21. A rotary lawn mower in accordance with claim 20 wherein said cutter blades rotating means are operable to rotate said cutter blades such that the speed of said first cutter blade is greater than the speed of said second cutter blade.

22. A rotary lawn mower in accordance with claim 20 wherein said vane means on said first and second cutter blades define lift areas such that said lift areas on said first cutter blade are greater than said lift areas on said second cutter blade.

23. A rotary lawn mower in accordance with claim 22 wherein said vane means on said first cutter blade have a greater vertical dimension than the vane means on said second cutter blade.

24. A rotary lawn mower in accordance with claim 13 wherein said first and second cutter blades have approximately the same length and are rotated at approximately the same speed.

* * * * *